Figure 5:
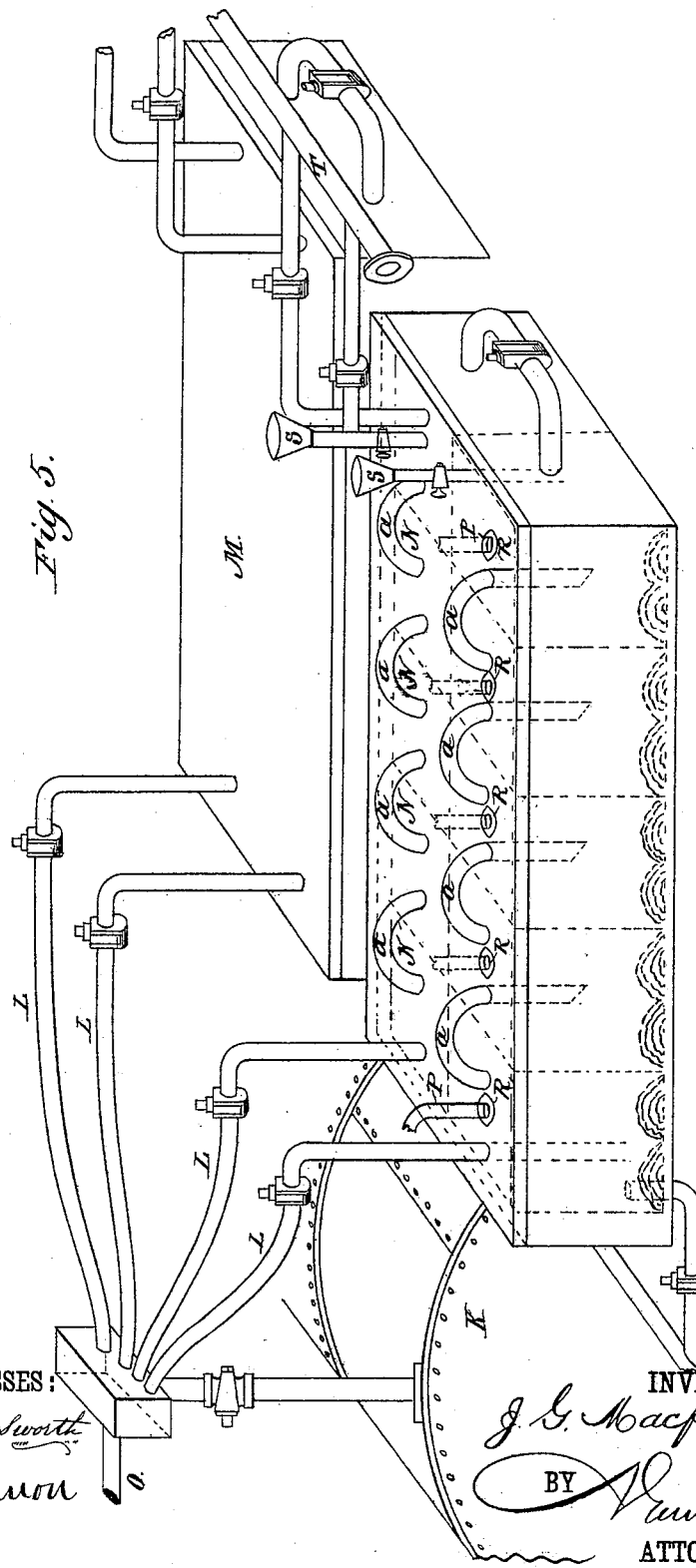

(No Model.) 6 Sheets—Sheet 1.
J. G. MACFARLAN.
PROCESS OF AND APPARATUS FOR THE MANUFACTURE OF AMMONIA AND ANIMAL CHARCOAL.
No. 267,550. Patented Nov. 14, 1882.
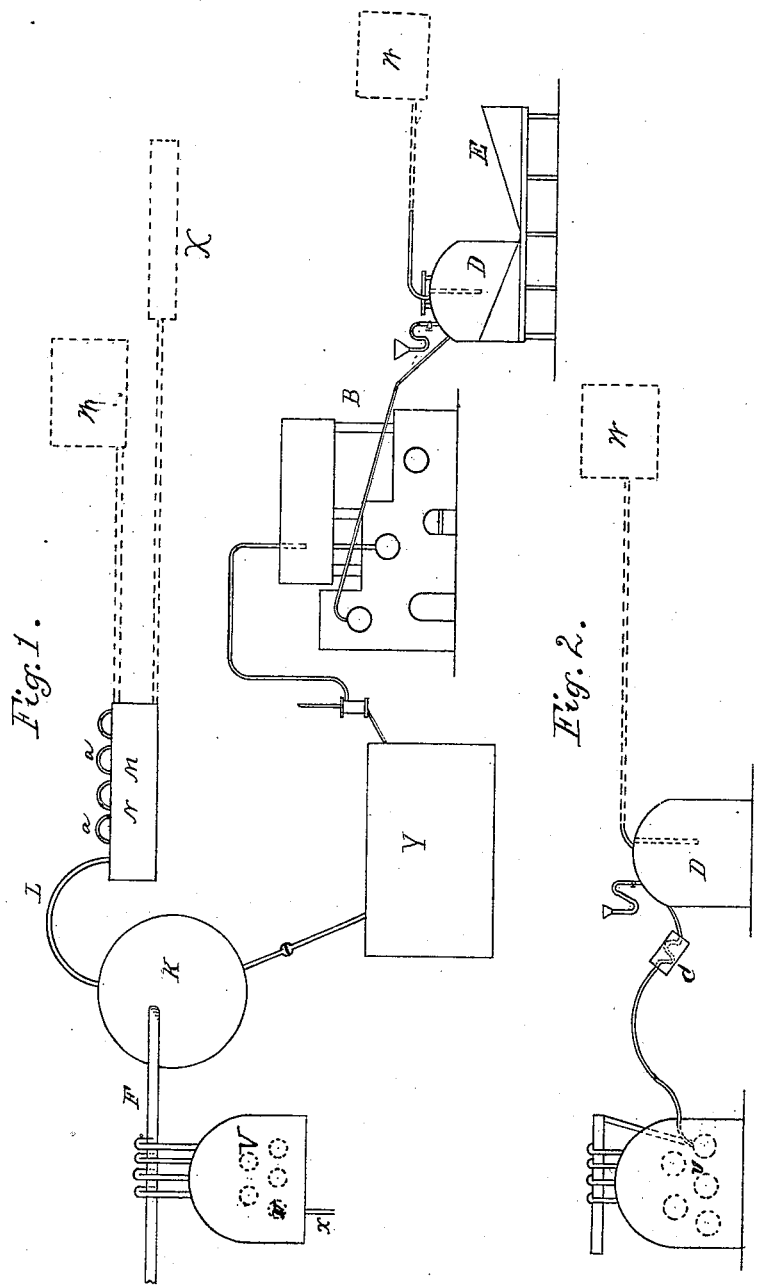
WITNESSES:
INVENTOR:
ATTORNEYS.

(No Model.) 6 Sheets—Sheet 2.
J. G. MACFARLAN.
PROCESS OF AND APPARATUS FOR THE MANUFACTURE OF AMMONIA AND ANIMAL CHARCOAL.
No. 267,550. Patented Nov. 14, 1882.
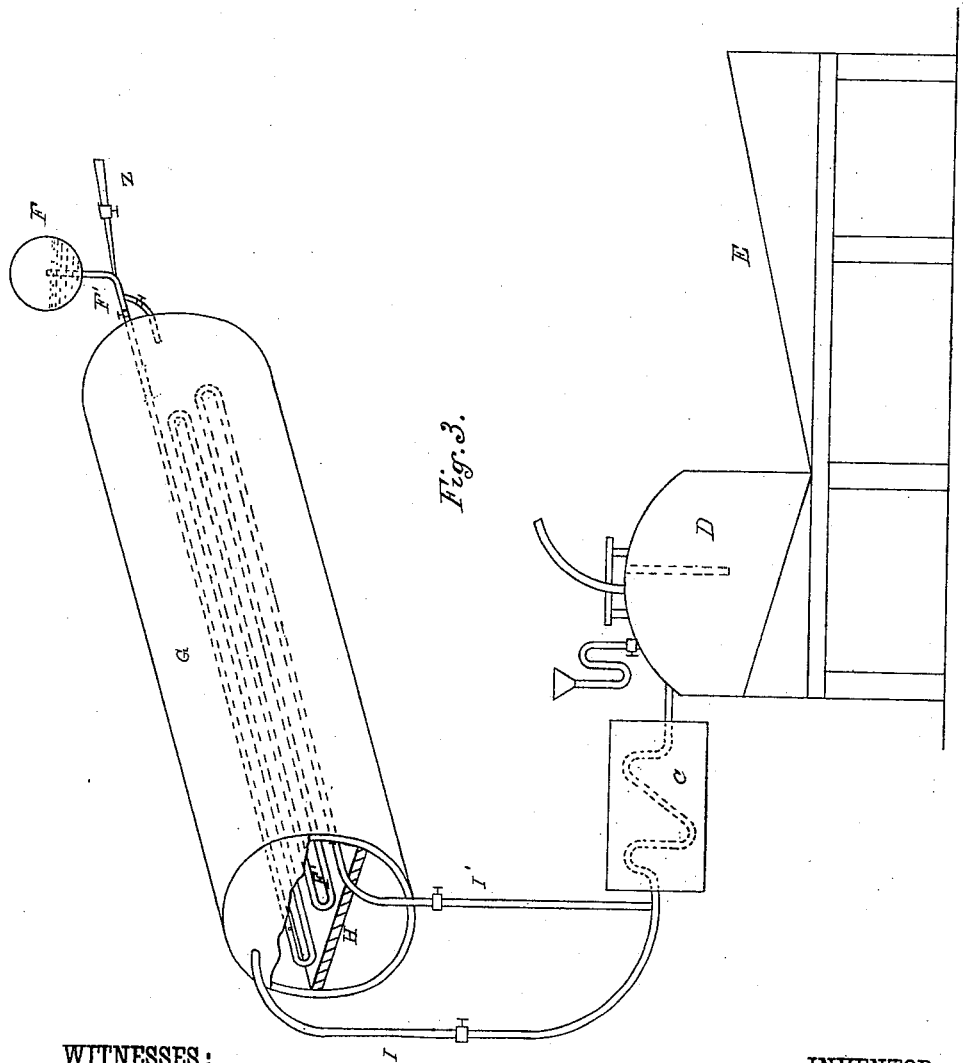
WITNESSES:
H B Brown
Amos W. Hart
INVENTOR:
J. G. Macfarlan
BY
ATTORNEYS.

(No Model.) 6 Sheets—Sheet 3.
J. G. MACFARLAN.
PROCESS OF AND APPARATUS FOR THE MANUFACTURE OF AMMONIA AND ANIMAL CHARCOAL.
No. 267,550. Patented Nov. 14, 1882.
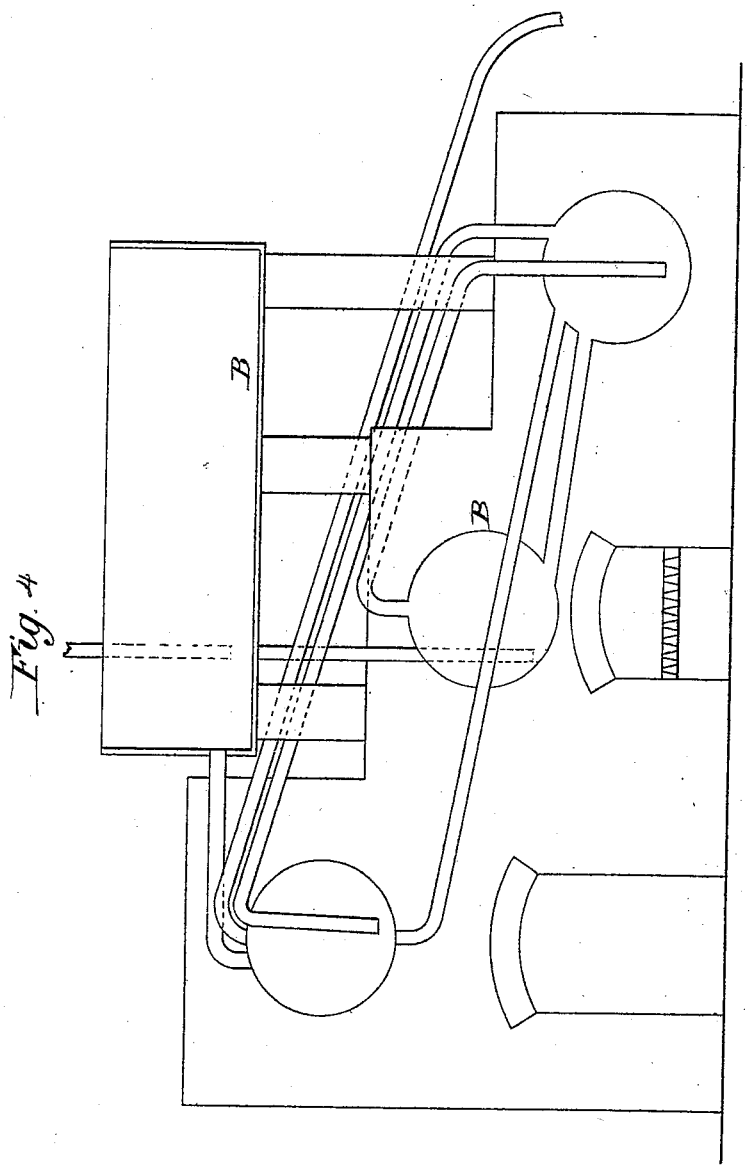
WITNESSES:
W. W. Hollingsworth
Solon C. Kemon
INVENTOR:
J. G. Macfarlan
BY
ATTORNEYS.

(No Model.) 6 Sheets—Sheet 4.
J. G. MACFARLAN.
PROCESS OF AND APPARATUS FOR THE MANUFACTURE OF AMMONIA AND ANIMAL CHARCOAL.

No. 267,550. Patented Nov. 14, 1882.

WITNESSES:
W. W. Hollingsworth
John C. Kenton

INVENTOR:
J. G. Macfarlan
BY
ATTORNEYS.

(No Model.) 6 Sheets—Sheet 5.
J. G. MACFARLAN.
PROCESS OF AND APPARATUS FOR THE MANUFACTURE OF AMMONIA AND ANIMAL CHARCOAL.
No. 267,550. Patented Nov. 14, 1882.
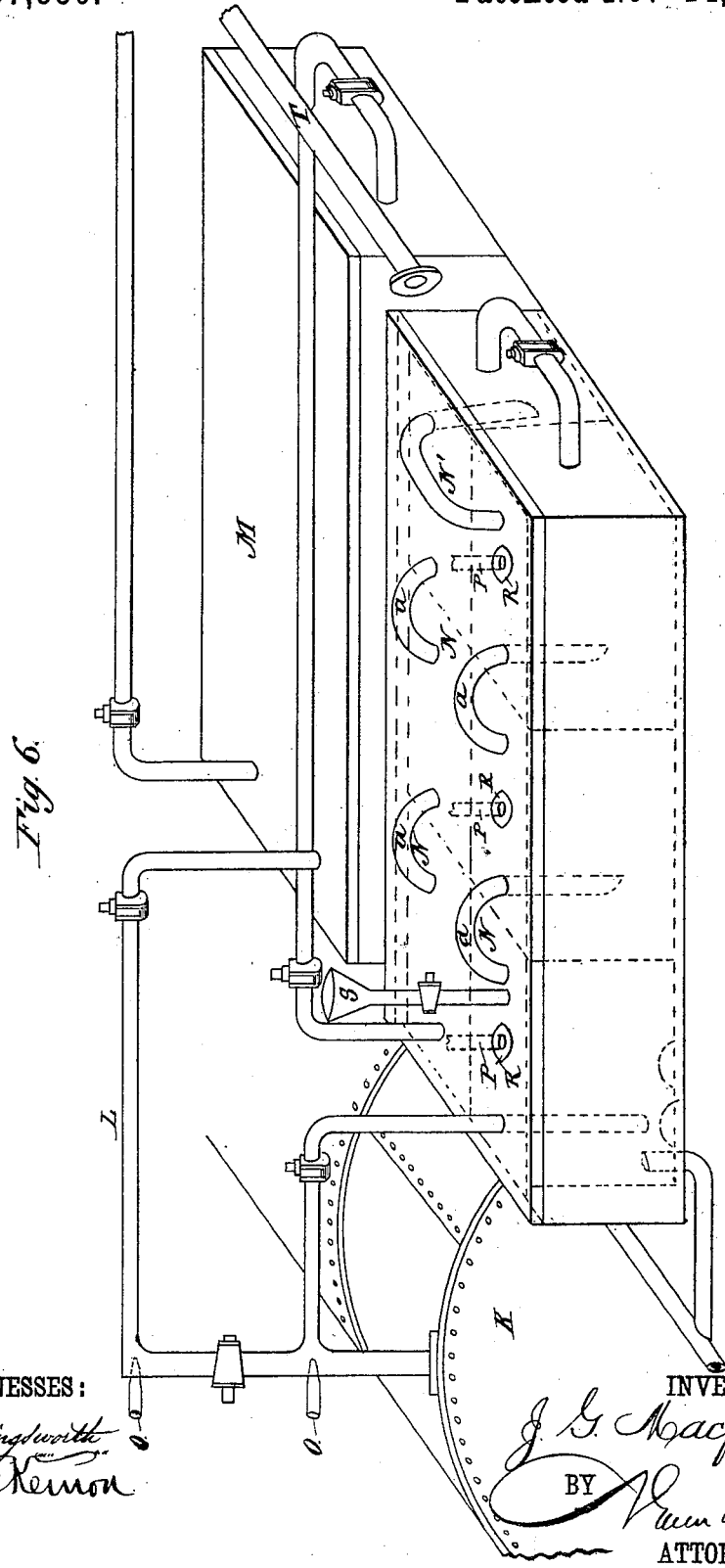

(No Model.) 6 Sheets—Sheet 6.
J. G. MACFARLAN.
PROCESS OF AND APPARATUS FOR THE MANUFACTURE OF AMMONIA AND ANIMAL CHARCOAL.
No. 267,550. Patented Nov. 14, 1882.
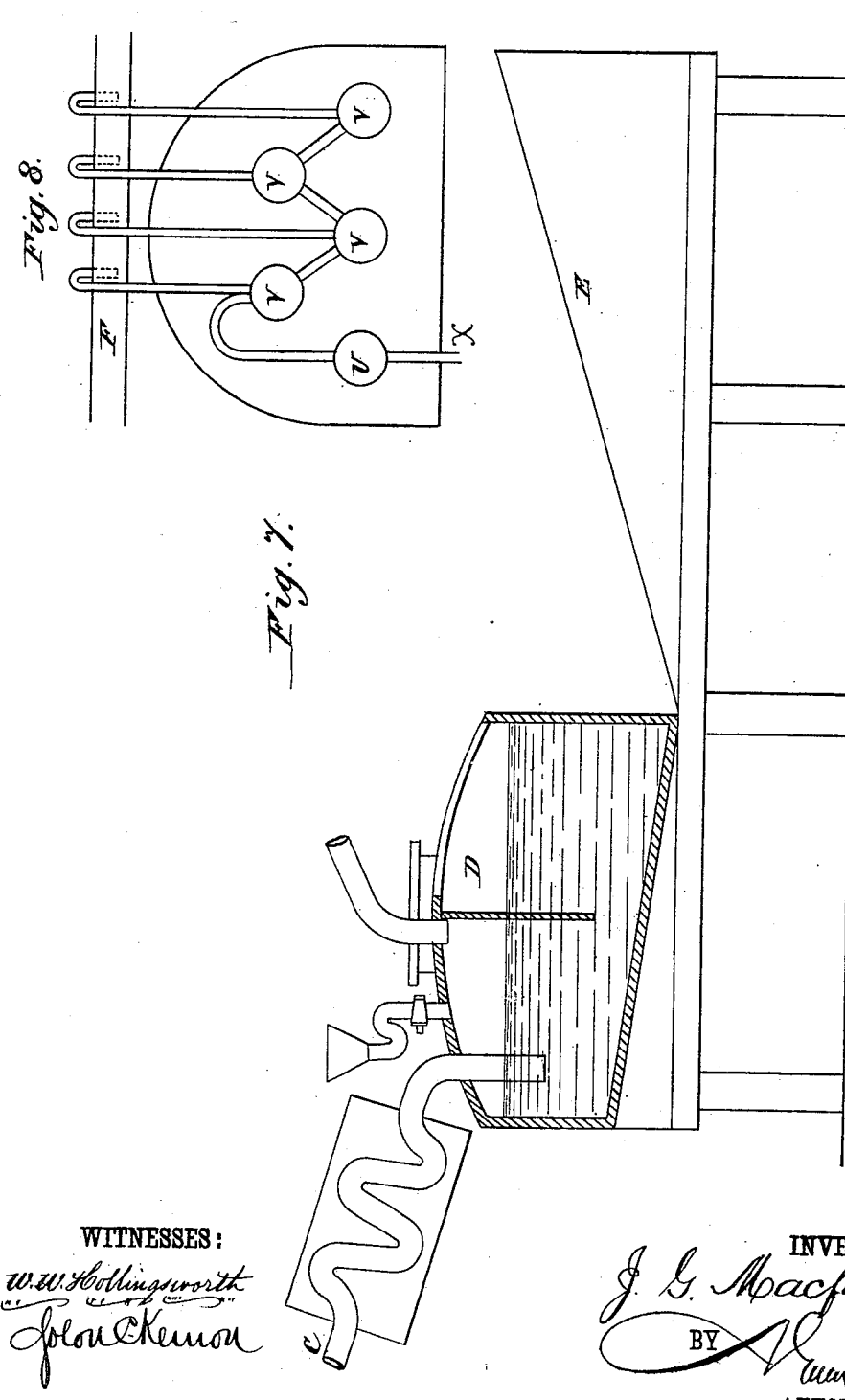
WITNESSES:
W. W. Hollingsworth
John C. Kenson
INVENTOR:
J. G. Macfarlan
BY
ATTORNEYS.

UNITED STATES PATENT OFFICE.

JOHN G. MACFARLAN, OF RICHMOND, COUNTY OF SURREY, ENGLAND.

PROCESS OF AND APPARATUS FOR THE MANUFACTURE OF AMMONIA AND ANIMAL CHARCOAL.

SPECIFICATION forming part of Letters Patent No. 267,550, dated November 14, 1882.

Application filed July 8, 1882. (No model.)

*To all whom it may concern:*

Be it known that I, JOHN G. MACFARLAN, of Richmond, county of Surrey, England, have invented a new and Improved Process of and Apparatus for the Manufacture of Animal Charcoal and By-Products, of which the following is a full, clear, and exact description, which will be readily understood by those skilled in the art to which my invention appertains.

In the accompanying drawings, (five sheets,) Figure 1 is a diagram showing the general connection and arrangement of a form of my apparatus, and Fig. 2 is a diagram of another form. Fig. 3 is a perspective view of one of the retorts for treating gases in connection with a scrubber. Fig. 4 represents a fractional still. Fig. 5 is a perspective view of my scrubber in connection with a condenser. Fig. 6 is a modification of the scrubber shown in Fig. 5. Fig. 7 is a sectional elevation of the saturator and drainer. Fig. 8 shows the arrangement of retorts for distilling bones with the aid of added carbonaceous matter and steam.

As is well known, when organic substances—such as bones—are treated in a closed vessel decomposition takes place, and the resulting products of such destructive distillation are gases and a solid residuum which is left in the retort. The said gases are mixed with vapors condensable into ammoniacal liquor, oil, tar, &c., and the solid residuum is a substance known as "animal charcoal" or "bone-black." By a method heretofore much practiced the bones are left in the retort for a period of about ten hours, and the resulting ammoniacal gases cooled and treated with acid for the production of a salt of ammonia and other commercial products.

My invention consists in the application of steam in the process of distillation, as hereinafter described.

The invention also consists in an improved acid-scrubber and other apparatus, as hereinafter described.

The letter V, Figs. 1, 2, and 8, indicates a series of bone-retorts; and the letter U a retort for receiving carbonaceous matter, such as coke. Superheated steam is admitted through pipe $x$ into retort U, and being decomposed therein it passes in the form of carbonic oxide and hydrogen successively through the retorts V and greatly accelerates the carbonization of the bones and increases the amount of ammonia produced. From the retorts V the distillate may pass into the main F, thence to the condenser K, Figs. 1, 5, where a portion of the ammoniacal and other gases are condensed. The uncondensed portion is forced into the acid and steam scrubber N M, Figs. 1, 5, by a steam-jet admitted through pipes O L. The scrubber consists of rectangular vessels, each divided by lengthwise and crosswise partitions into two rows of chambers or compartments containing sulphuric acid, which is supplied through funnels S. The several chambers communicate by means of short curved pipes $a$, that lead from the top of one chamber nearly to the bottom of the next (in the row or series) wherein they dip into the acid. Steam being admitted, as before stated, through pipe O for conveying the gases from the boiler-shaped condenser K through pipes L into the first acid-chambers of the series, is forced thence through pipes $a$ successively into and through the remaining chambers, finally escaping from the scrubbers into pipe T, which conveys them to the fires, or to a gas-holder, W, (shown in dotted lines, Fig. 1.) The ammoniacal gas is arrested by the acid in the scrubber N M, and the resulting product—a sulphate liquor—is conducted to the evaporator X, (shown by dotted lines, Fig. 1,) and the salt obtained in the usual way. By a suitable arrangement of the pipes the gases may be passed through one or more rows of the acid-scrubber at will, as conditions may require. A form of apparatus well adapted for this operation is shown in Fig. 6.

The deposition or formation of tar and salts of sesquicarbonate of ammonia would fill the chambers of scrubbers N M, so as to choke the exits and arrest the passage of the gases but for the induction of steam through pipes P, Fig. 5, which pass through holes in lids R, that are adapted for removal to facilitate cleaning the chambers. The softening and dissolving action of the steam therefore prevents the accumulation of the tar and ammonia salts and consequent blockage of the apparatus, and renders the operation continuous, so that a considerable economy of time and labor is effected. From condenser K the ammoniacal liquor and oil products are run into a receiver, Y, Fig. 1, and the ammoniacal liquor raised by a pump or other means to a tank for supplying the fractional still B, Figs. 1 and 4. From the latter the ammoniacal gas is conducted to the saturator or scrubber D, in which the salt is formed, whence it is removed (by a ladle or other suitable means) and thrown upon a strainer, E.

Another mode of employing the acid-scrubber is illustrated in Fig. 2, and is more particularly applicable when it is not desired to manufacture animal pitch from the tar, but to use it instead for fuel. The retorts are the same as shown in Fig. 1, except that the last retort of the bed is connected with the main, so that all the distillate may be passed through it, and also provided with a zigzag or coil of pipe, as shown in Fig. 3, and is used as a heater of the distillate, with or without superheated steam.

The pipe F', Fig. 3, is arranged above a diaphragm, H, upon which lime is placed, and provided outside of said retort with a branch pipe, as shown, or is otherwise so constructed as to allow the gases to escape into the retort when it is requisite to purify them by the action of the lime. In such case the gas passes through pipe I, through the cooler C, and saturator D, Figs. 1, 7, where the ammonia is arrested, as before described. When such purification by lime is not necessary the gas passes directly through the coiled pipe F', and thence by pipe I' to the saturator D. Suitable valves or stop-cocks are provided in the pipes I I'. It will be understood, then, that the gas is to be allowed to pass through the pipe F' or not, at discretion.

In working with this apparatus the condenser, fractional still, and evaporating-pan hitherto employed are dispensed with, and there will be very little supernatant oil or tar to deal with. Such quantity as there may be is run into a tank and subjected to further treatment. Steam, preferably superheated, is admitted into pipe Z, Fig. 3, preferably at a point outside the retort G, for the purpose of assisting in decomposing the hydrocarbons. The steam will pass through the zigzag F' or through the body of the retort, at option.

It will be understood that suitable stop-cocks are provided for pipe F' and its branch, and also for the pipes leading from the retorts to the main, Figs. 2, 8, in order to cause the distillate to take the desired course; and, further, that the retort G (shown in Fig. 3) is used, when desirable, in the apparatus illustrated in Fig. 1.

The sulphuric acid employed is preferably of a specific gravity ranging between 1.380 and 1.60, since when thus diluted it has been found to effect the best results.

In place of using sulphuric acid in the scrubber and saturator D, I may use hydrochloric acid, and in such case the solution will obviously be a hydrochlorate or muriate of ammonia.

I propose to use ivory-black as a lute for the retorts.

I am aware of the use of steam for the purpose of revivifying charcoal, the same being described in Patent No. 179,579, and I hereby disclaim it.

What I claim is—

1. The process of making animal charcoal and treating the by-products thereof, which consists in passing superheated steam through carbonaceous matter and then into the bone-retorts, and subsequently mixing steam with the vapors and gases from said retorts, as described.

2. The process of making animal charcoal, which consists in passing superheated steam through carbonaceous matter and then into the bone-retorts, as described.

3. In combination with a bench of retorts and hydraulic main connected therewith, the acid-scrubber divided into compartments provided with steam-pipes to prevent clogging, as shown and described.

4. In a scrubber for purifying gas, divided into compartments, the steam-pipes P, arranged as shown, to prevent clogging, substantially as described.

5. A decomposing-retort, G, containing a zigzag or pipe coil, F', provided with branches and valves so arranged as to pass the flow of gas through the coil or directly through the body of the retort, substantially as specified.

The above specification signed by me this 28th day of April, 1882.

J. G. MACFARLAN.

Witnesses:
  W. HILLIER,
21 *Cockspur Street, London, S. W.*
  AUG. SPICAUD,
*Clerk to Messrs. Comerford & Co., 7 Tokenhouse Yard, Lothbury, London, Public Notaries.*